US012612965B2

(12) United States Patent
Heiberg et al.

(10) Patent No.: US 12,612,965 B2
(45) Date of Patent: Apr. 28, 2026

(54) METHODS AND APPARATUS TO PASSIVELY LUBRICATE A WORM GEAR ASSEMBLY

(71) Applicant: The Boeing Company, Arlington, VA (US)

(72) Inventors: Christopher J. Heiberg, Sunset Beach, CA (US); Dong Ngo, Santa Ana, CA (US)

(73) Assignee: THE BOEING COMPANY, Arlington, VA (US)

(*) Notice: Subject to any disclaimer, the term of this patent is extended or adjusted under 35 U.S.C. 154(b) by 260 days.

(21) Appl. No.: 18/169,316

(22) Filed: Feb. 15, 2023

(65) Prior Publication Data

US 2024/0271695 A1    Aug. 15, 2024

(51) Int. Cl.
| | |
|---|---|
| *F16H 25/20* | (2006.01) |
| *B64C 13/34* | (2006.01) |
| *F16H 1/16* | (2006.01) |
| *F16H 55/22* | (2006.01) |
| *F16H 57/04* | (2010.01) |

(52) U.S. Cl.
CPC ......... F16H 57/0498 (2013.01); B64C 13/34 (2013.01); F16H 1/16 (2013.01); F16H 55/22 (2013.01); F16H 57/0423 (2013.01); F16H 57/0427 (2013.01)

(58) Field of Classification Search
CPC ........ F16H 57/0498; F16H 1/16; F16H 55/22; F16H 57/0423; F16H 57/0427; B64C 13/34
See application file for complete search history.

(56) References Cited

U.S. PATENT DOCUMENTS

| | | | | |
|---|---|---|---|---|
| 3,424,022 | A * | 1/1969 | Greenberg .......... | F16H 57/0431 74/468 |
| 5,242,033 | A * | 9/1993 | Toraason ............ | F16H 57/0456 184/6.12 |
| 11,738,635 | B2 * | 8/2023 | Tametani ............. | B60K 11/085 180/68.1 |
| 2007/0175706 | A1 * | 8/2007 | Shilo ................... | F16H 57/0427 184/6.12 |
| 2018/0202437 | A1 * | 7/2018 | Flavelle .............. | F04C 15/0019 |

FOREIGN PATENT DOCUMENTS

| | | | | |
|---|---|---|---|---|
| WO | WO-2011024712 | A1 * | 3/2011 | .......... F03D 11/0008 |
| WO | WO-2017046508 | A1 * | 3/2017 | ............... F16H 1/16 |

* cited by examiner

*Primary Examiner* — Zakaria Elahmadi

(74) *Attorney, Agent, or Firm* — Hanley, Flight & Zimmerman, LLC

(57) ABSTRACT

Methods and apparatus to passively lubricate a worm gear assembly are disclosed herein. An example worm gear assembly includes a housing defining an internal cavity, a worm gear in the internal cavity of the housing, and a worm wheel in the internal cavity of the housing. The worm wheel is meshed with the worm gear. The worm wheel includes a first side surface, a second side surface opposite the first side surface, a peripheral edge with a plurality of teeth between the first side surface and the second side surface, and a vane on the first side surface. The vane extends radially between a center of the first side surface and the peripheral edge. The vane is to move lubricant from a bottom of the housing to the worm gear to lubricate an interface between the worm gear and the worm wheel.

22 Claims, 13 Drawing Sheets

1

METHODS AND APPARATUS TO PASSIVELY LUBRICATE A WORM GEAR ASSEMBLY

FIELD OF THE DISCLOSURE

This disclosure relates generally to worm gear assemblies and, more particularly, to methods and apparatus to passively lubricate a worm gear assembly.

BACKGROUND

Worm gears provide high gear reduction ratios, which results in high torque output. Worm gears also have limited or reduced backdrive. Therefore, worm gears are typically used in applications where high torque and limited backdrive are desired. For example, worm gears are often used in high lift actuators on the leading edges and trailing edges of aircraft wings. On the trailing edge, a high lift actuator can be used to move a flap to increase or decrease lift during take-off and landing. These worm gears typically require lubricants to reduce wear on the parts.

SUMMARY

An example worm gear assembly disclosed herein includes a housing defining an internal cavity and a worm gear in the internal cavity of the housing. The worm gear is coupled to a first shaft extending through the housing. The worm gear assembly also includes a worm wheel in the internal cavity of the housing. The worm wheel is meshed with the worm gear. The worm wheel is coupled to a second shaft extending through the housing. The worm wheel includes a first side surface, a second side surface opposite the first side surface, a peripheral edge with a plurality of teeth between the first side surface and the second side surface, and a vane on the first side surface. The vane extends radially between a center of the first side surface and the peripheral edge. The vane is to move lubricant from a bottom of the housing to the worm gear to lubricate an interface between the worm gear and the worm wheel.

An example method for passively lubricating a worm gear assembly disclosed herein includes rotating a worm gear of the worm gear assembly with an actuator. The worm gear assembly includes the worm gear and a worm wheel meshed with the worm gear. The method further includes rotating the worm wheel through the rotation of the worm gear. The worm wheel includes a first side surface, a second side surface opposite the first side surface, a peripheral edge with a plurality of teeth between the first side surface and the second side surface, and a vane on the first side surface. The vane extends radially between a center of the first side surface and the peripheral edge. The method also includes collecting, as the worm wheel rotates, a lubricant with the vane from a lubricant pool, and dispensing the lubricant from the vane onto the worm gear.

An example aircraft disclosed herein includes a high lift device moveably coupled to a wing of the aircraft, and a worm gear assembly to move the high lift device. The worm gear assembly includes a housing defining an internal cavity and a first baffle and a second baffle in the internal cavity coupled to the housing. The first and second baffle have a curved shape. The worm gear assembly also includes a worm gear in the internal cavity of the housing. The worm gear is coupled to a first shaft extending through the housing. The worm gear assembly also includes a worm wheel in the internal cavity of the housing. The worm wheel is meshed with the worm gear. The worm wheel is coupled to a second shaft extending through the housing. The worm wheel is disposed adjacent to the first and second baffles. The worm wheel includes a first side surface, a second side surface opposite the first side surface, a peripheral edge with a plurality of teeth between the first side surface and the second side surface, and a vane on the first side surface. The vane is to move lubricant from a bottom of the housing to the worm gear to lubricate an interface between the worm gear and the worm wheel.

Figure 1:
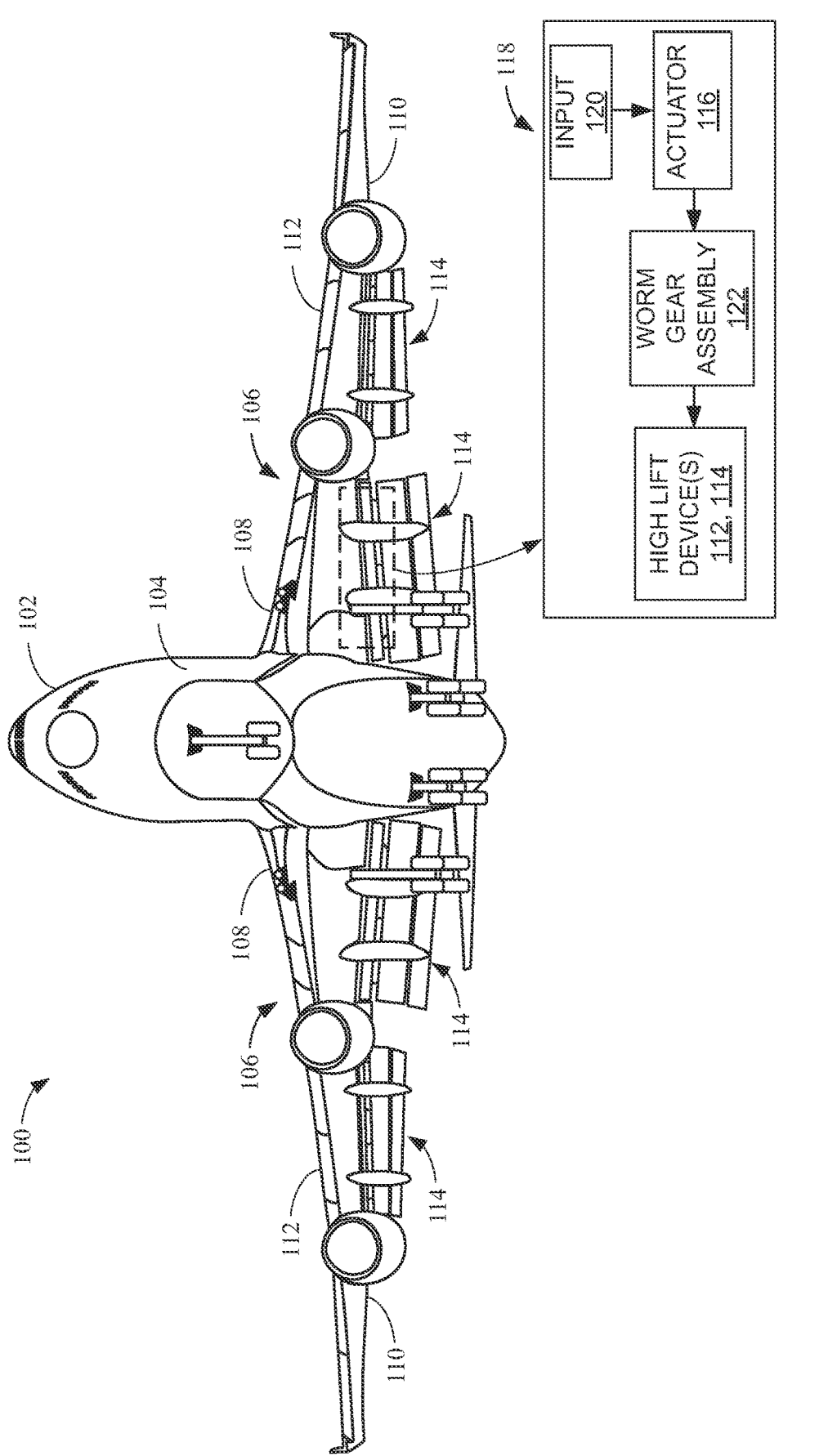
FIG. 1 illustrates an example environment with an example aircraft in which the example worm gear assemblies disclosed herein may be implemented.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of ±10% unless otherwise specified in the below description.

DETAILED DESCRIPTION

Worm gear assemblies or drives include a worm gear, sometimes just referred to as a worm, and a worm wheel, such as a spur gear. The worm gear has a shaft with a spiral tooth (e.g., a screw) that is engaged or meshed with the teeth on the worm wheel. The worm gear is typically used as the input or drive gear and the worm wheel is typically used as the output or driven gear. Depending on the size and number of teeth of the worm gear and worm wheel, this arrangement can provide a relatively high gear reduction ratio, which results in high torque multiplication. This worm gear arrangement also reduces or limits backdrive of the input or drive gear. As such, worm gear assemblies are often used on heavy duty applications such as an aircraft high lift devices (e.g., flap actuators). High lift devices such as flaps on an aircraft require a mechanism that is reliable to be able to move to a desired position given the intensity of aerodynamic forces and to prevent backdrive. Therefore, in some instances, worm gear assemblies are used due to their high torque output and limited backdrive. However, due to the meshing design of the teeth, worm gear assemblies can produce a large amount of friction and heat. As such, worm gear assemblies typically require a lubricant to ensure the proper lubrication of the gears to reduce or limit frictional wear.

As mentioned above, worm gear assemblies perform most efficiently and reliably when they are properly lubricated to prevent frictional damages to the components rubbing together. Some known worm gear assemblies use an injector spray and/or a pump system to inject lubricant (e.g., oil) into the assembly to lubricate the gears. However, these known systems are relatively complex and require additional components, specifically fluid injectors and/or pumps to distribute the oil as necessary. These components are additional failure points in the overall system. Further, these injectors and/or pumps add weight to the aircraft, which reduces flight efficiency.

Disclosed herein are example worm gear assemblies that have features for passively lubricating the gear mesh during operation of the worm gear assembly. As such, the example worm gear assemblies disclosed herein do not require injectors and/or pumps as seen in known worm gear assemblies. This eliminates multiple failure points associated with the pumping systems, and also reduces the weight added to the aircraft (or other vehicle in which the gear assembly is incorporated).

An example worm gear assembly disclosed herein includes a worm gear and a worm wheel. The worm gear is coupled to an actuator and the worm wheel is coupled to a drive mechanism to control the flaps of an aircraft. The worm gear and the worm wheel are meshed together via a plurality of teeth. The worm gear and the worm wheel are disposed in a housing or casing. The housing contains lubricant, such as oil, which forms a lubricant pool at the bottom of the housing. The lubricant is passively collected by the worm wheel from the lubricant pool as the worm wheel rotates and distributes the lubricant to the meshing of the teeth between the worm gear and the worm wheel.

In examples disclosed herein, the lubricant is passively collected by vanes on the worm wheel. As the worm wheel rotates, the vanes carry the lubricant up to the gear mesh. In some examples, the worm gear assembly includes one or more baffles in the housing. The baffles help to contain the lubricant along the vanes as the worm wheel is rotated and allows the vanes to distribute a proper amount of lubricant on the meshing teeth.

FIG. 1 illustrates an example environment 100 in which the example worm gear assemblies disclosed herein may be implemented. The example environment 100 includes an aircraft 102. In the illustrated example, the aircraft 102 includes a fuselage 104 and two wings 106 extending from the fuselage 104. The wings 106 include high lift devices 112, 114 along leading edges 108 and trailing edges 110 of each of the wings 106, which are movably coupled to the wings 106 of the aircraft 102. In this example, the high lift devices 112, 114 of the aircraft 102 can include one or more leading edge flaps 112 and/or one or more trailing edge flaps 114. The flaps 112, 114 can be deployed during certain phases of flight, such as take-off and landing, to increase lift. In the illustrated example, the leading edge flaps 112 and the trailing edge flaps 114 are depicted in a landing position. That is, the leading edge flaps 112 extend forward from the leading edge 108 and the trailing edge flaps 114 extend aft and downward of the trailing edge 110.

The leading edge flaps 112 and the trailing edge flaps 114 experience relatively large forces from the air flowing around the wings 106, particularly when the flaps 112, 114 are extended. Typically, one or more actuators or motors are used to position the flaps 112, 114. For example, FIG. 1 shows an example actuator 116 that can be used to deploy or retract one or more of the example flaps 112, 114. The actuator 116 can include additional braking devices or no-back devices to prevent backdrive of the actuator 116 and maintain a position of the flaps 112, 114. However, these additional devices are expensive and add weight to the aircraft 102, which reduces fuel efficiency of the aircraft 102.

An example high-lift device operation 118 illustrates one example of a configuration to position the flaps 112, 114. In some examples, the actuator 116 receives an input 120 from a pilot and/or an auto-pilot system. In the example environment 100 of FIG. 1, the input 120 may be a flap lever inside the cockpit of the aircraft 102, an override from the aircraft's auto-pilot system, etc. The input 120 is used to command the actuator 116 (or a motor) to position the flaps 112, 114 (e.g., high-lift devices) to the desired position. In this example, the aircraft 102 includes an example worm gear assembly 122. The actuator 116 drives the worm gear assembly 122, which drives or moves one or more components (e.g., a rack, a linkage) to deploy or retract the flaps 112, 114.

The actuator 116 for the flaps 112, 114 described herein does not include additional devices, thus reducing cost and improving fuel efficiency of the aircraft 102. Additionally, the example apparatus described herein may increase reliability of the actuator 116 and the flaps 112, 114 because fewer components are used to enable the proper function of the flaps 112, 114 and, thus, reduces the likelihood of failure of the components. While the example worm gear assemblies are described in connection with high-lift devices on an aircraft, the example worm gear assemblies disclosed herein can also be use in other applications such as submarine vehicles, spacecraft, etc.

Figure 2:
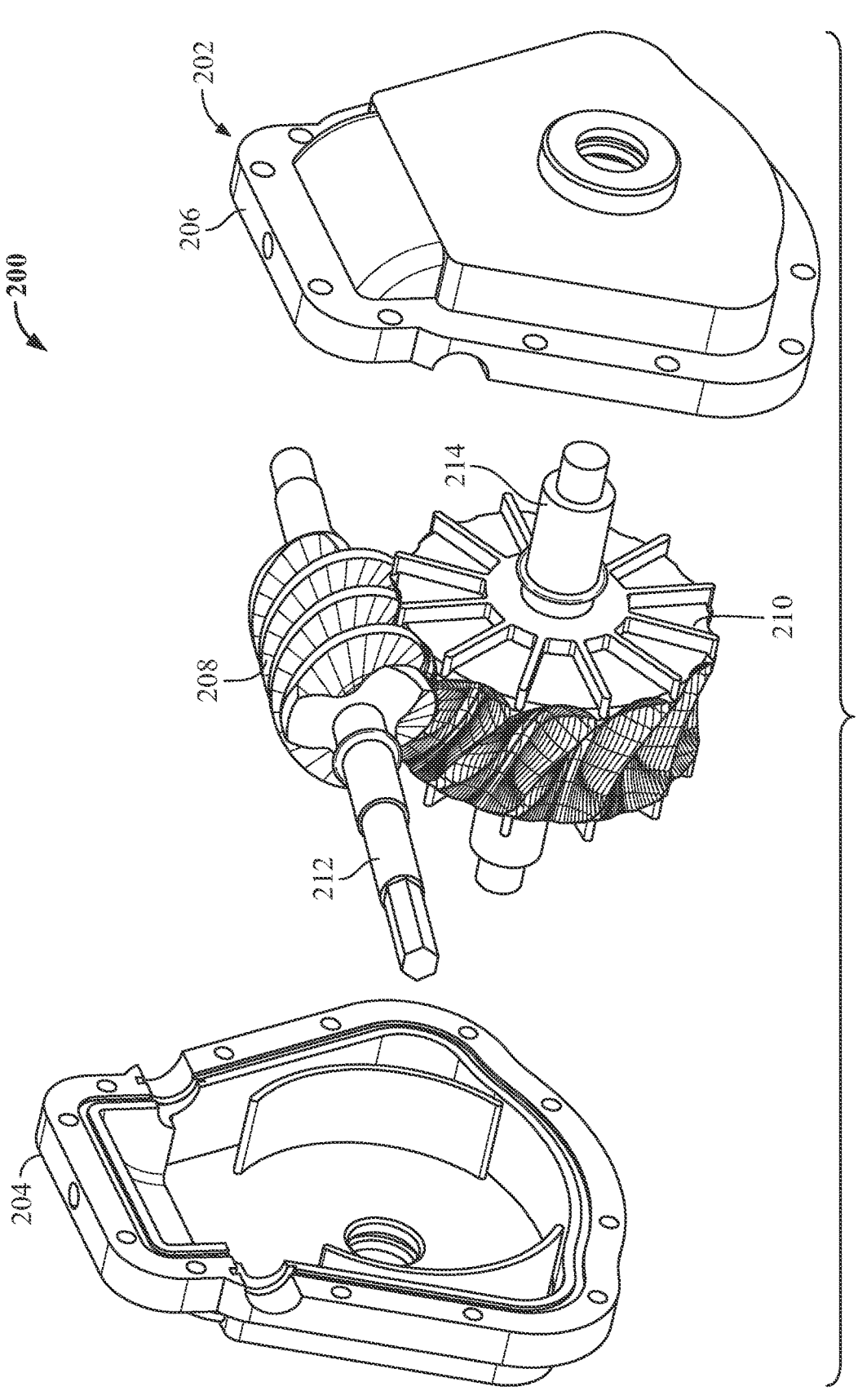
FIG. 2 is an exploded view of an example worm gear assembly.

FIG. 2 is an exploded view of an example worm gear assembly 200 constructed in accordance with the teachings of this disclosure. The example worm gear assembly 200 can be implemented as the worm gear assembly 122 in the aircraft 102 and used for positioning the flaps 112, 114. In the illustrated example, the example worm gear assembly 200 includes a housing 202, a worm gear 208, and a worm wheel 210. In this example, the housing 202 is constructed of a first housing portion 204 and a second housing portion 206. In FIG. 2, the first and second housing portions 204, 206 are shown as separated.

In the illustrated example of FIG. 2, the worm gear 208 and the worm wheel 210 are shown as meshed together. The worm gear 208 is coupled to a first shaft 212, and the worm wheel 210 is coupled to a second shaft 214. In some examples, the second shaft 214 is operably coupled to a mechanism (e.g., a rack) that deploys or retracts the flaps 112, 114. The first shaft 212 is driven by the actuator 116 and therefore drives the worm wheel 210. Therefore, the first shaft 212 may be referred to as input shaft or a driving shaft, and the second shaft 214 may be referred to as an output shaft or a driven shaft. When the worm gear assembly 200 is assembled, the first housing portion 204 and the second housing portion 206 are coupled together (e.g., create a single housing) and surround/encase the worm gear 208 and the worm wheel 210. As disclosed in further detail herein, the coupling of the first housing portion 204 and the second housing portion 206 defines an internal cavity in which lubricant can be located to lubricate the worm gear 208 and the worm wheel 210 during operation.

Figure 3:
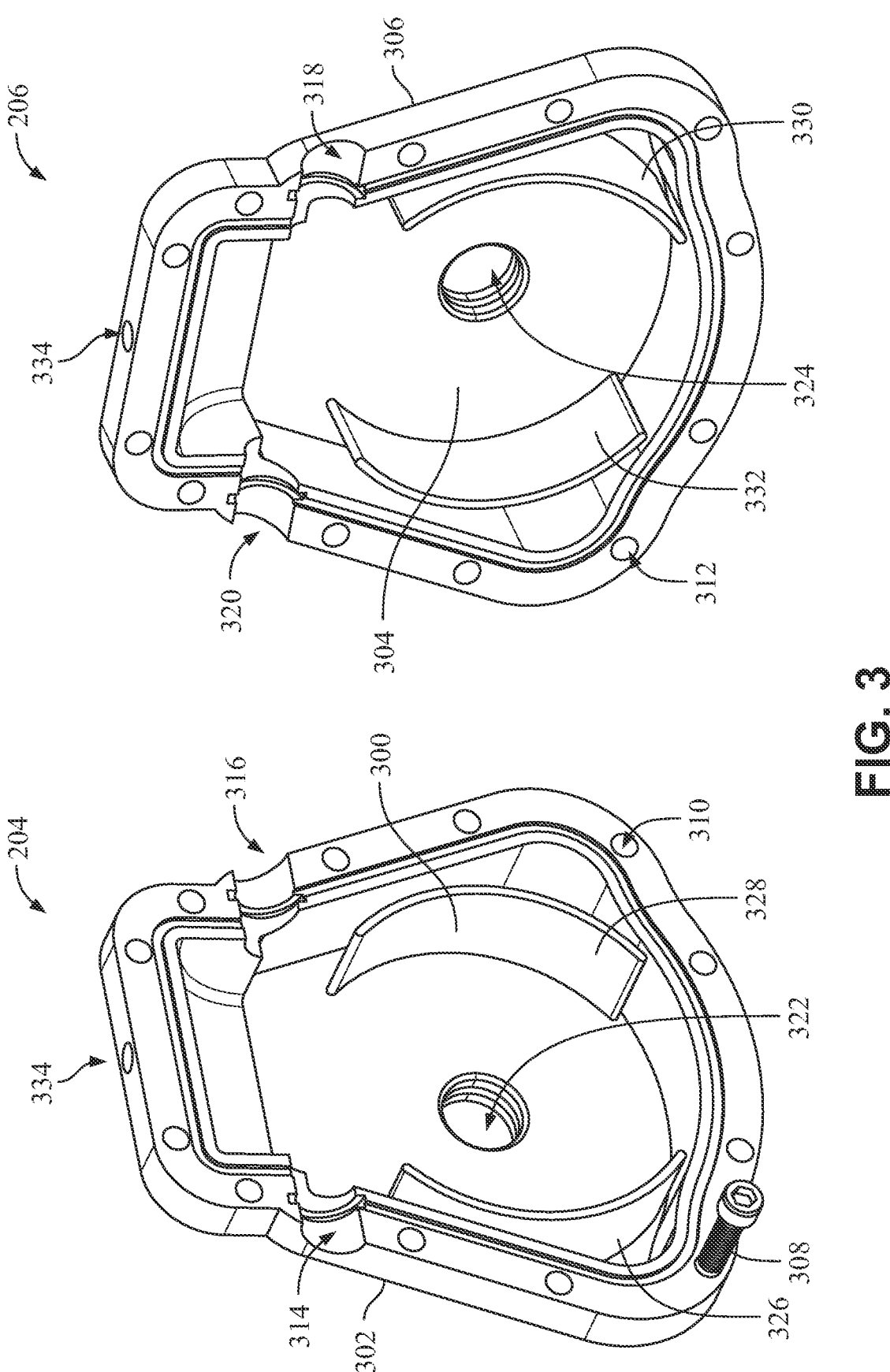
FIG. 3 illustrates example housing portions of an example housing that encases example gears of the example worm gear assembly of FIG. 2.

FIG. 3 shows the first housing portion 204 and the second housing portion 206 of the housing 202. The first and second housing portions 204, 206 are the same or substantially the same. As such, when the first and second housing portion 204, 206 are coupled together, the first and second housing portions 204, 206 form a symmetrical housing or casing. The first housing portion 204 has a first side 300 (an inner facing side) and a second side 302 (an outer facing side) opposite the first side 300. Similarly, the second housing portion 206 has a first side 304 (an inner facing side) and a second side 306 (an outer facing side) opposite the first side 304. When the first and second housing portions 204, 206 are coupled, the first sides 300, 304 face each other and form an internal cavity, as disclosed in further detail herein. In this example, the first housing portion 204 and the second housing portion 206 are coupled via a plurality of threaded fasteners 308, such as bolts (one of which is shown in FIG. 3). The first housing portion 204 has a first plurality of fastener openings 310 (one of which is referenced in FIG. 3) arranged around the perimeter of the first housing portion 204. Similarly, the second housing portion 206 has a second plurality of fastener openings 312 (one of which is reference in FIG. 3) arranged around the perimeter of the second housing portion 206 and align with the first plurality of fastener openings 310. The threaded fasteners 308 can be inserted (e.g., threaded into) respective ones of the first and second plurality of fasteners openings 310, 312 to couple the first and second housing portions 204, 206. In other examples, the first and second housing portions 204, 206 can be coupled via other chemical and/or mechanical fastening techniques (e.g., welding, clamps, rivets, adhesives, etc.).

In the illustrated example, the first housing portion 204 has a first semi-circular groove 314 and a second semi-circular groove 316. Similarly, the second housing portion 206 has a third semi-circular groove 318 and a fourth semi-circular groove 320. When the first and second housing portions 204, 206 are coupled together, the first and third semi-circular grooves 314, 318 form a first shaft opening and the second and fourth semi-circular grooves 316, 320 form a second shaft opening. When the worm gear assembly 200 (FIG. 2) is assembled, the first shaft 212 (FIG. 2) extends through the first and second shaft openings. As mentioned above, in some examples, the first shaft 212 is an input drive shaft that is driven by the actuator 116.

In the illustrated example, the first housing portion 204 has a third shaft opening 322 and the second housing portion 206 has a fourth shaft opening 324. When the first and second housing portions 204, 206 are coupled and the worm gear assembly 200 is assembled, the second shaft 214 (FIG. 2) that is coupled to the worm wheel 210 extends through the third and fourth shaft openings 322, 324. As mentioned above, in some examples, the second shaft 214 is an output shaft coupled to a drive mechanism for moving the flaps 112, 114 to the desired position.

In the illustrated example, the first housing portion 204 includes a first baffle portion 326 and a second baffle portion 328 extending from and coupled to the first side 300. Similarly, the second housing portion 206 includes a third baffle portion 330 and a fourth baffle portion 332 extending from and coupled to the first side 304 of the second housing portion 206. When the first and second housing portions 204, 206 are coupled, the first and third baffle portions 326, 330 engage form a first baffle and the second and fourth baffle portions 328, 332 engage to form a second baffle, the first and second baffles being disposed within the internal cavity of the housing 202. When the worm gear 208 and the worm wheel 210 are disposed in the housing 202, the first and second baffles are disposed adjacent to a portion of the worm wheel 210. The first and second baffles help direct lubricant up to the gear mesh, as disclosed in further detail herein. In some examples, when the first and second housing portion 204, 206 are coupled, the first and third baffle portions 326, 330 are sealingly engaged or coupled, such that fluid cannot escape between the first and third baffle portions 326, 330. The second and fourth baffle portions 328, 332 are similarly sealingly engaged or coupled. In the illustrated example, the first and second baffles have a curved or arcuate shape. In some examples, the first and second baffles have the same radius of curvature as the worm wheel 210.

In the illustrated example of FIG. 3, the first and housing portions 204, 206 have fluid service holes 334. The fluid service holes 334 enable a person or machine to fill and/or drain fluid/lubricant from the internal cavity of the housing 202. In the examples disclosed herein, the worm gear assembly 200 includes a lubricant to lubricate the gears to reduce friction. The fluid service holes 334 allow for the lubricant to be drained and/or filled easily without the need to disassemble the worm gear assembly 200. In some examples, only one of the housing portions 204, 206 may have a fluid service hole.

Figure 4A:
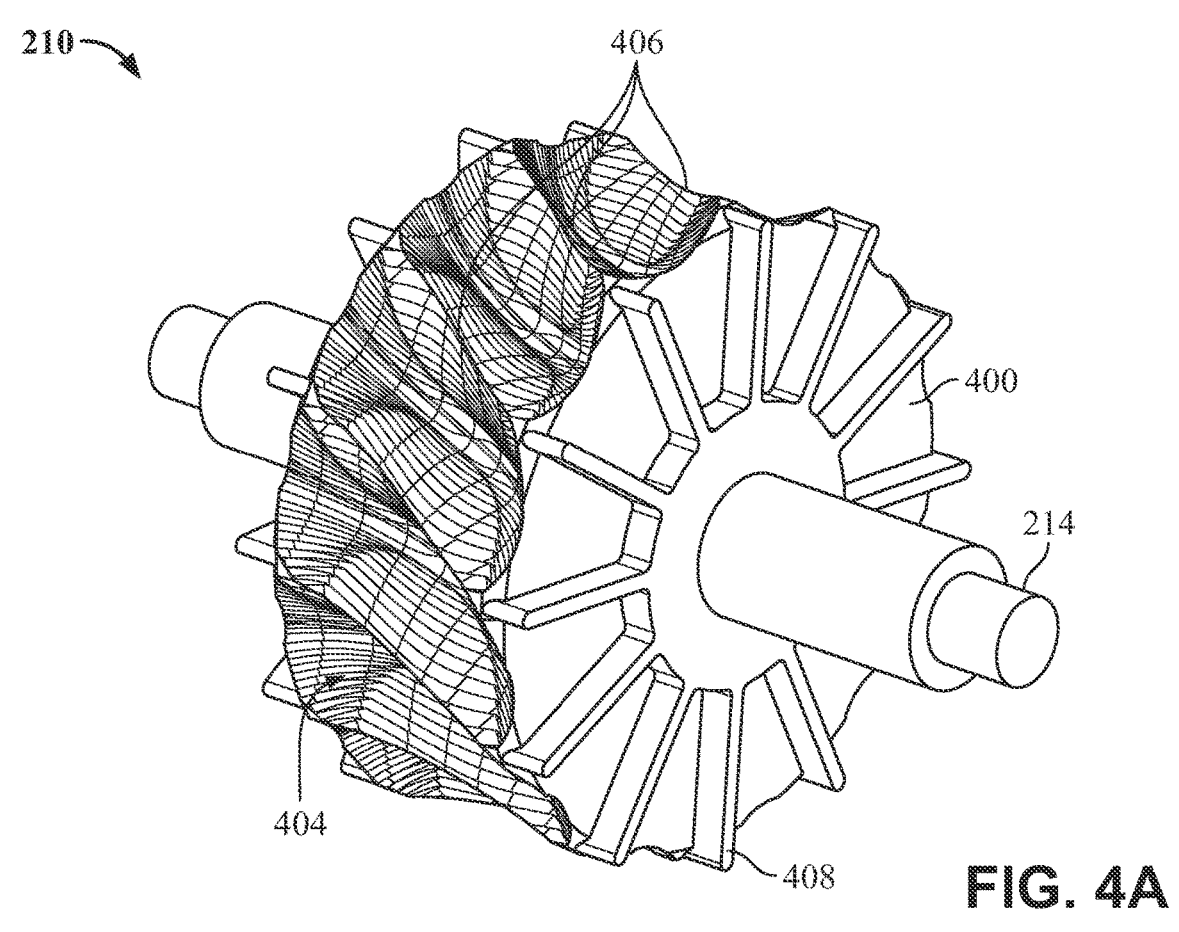
FIGS. 4A and 4B are perspective views of an example worm wheel of the example worm gear assembly of FIG. 2.
Figure 4B:
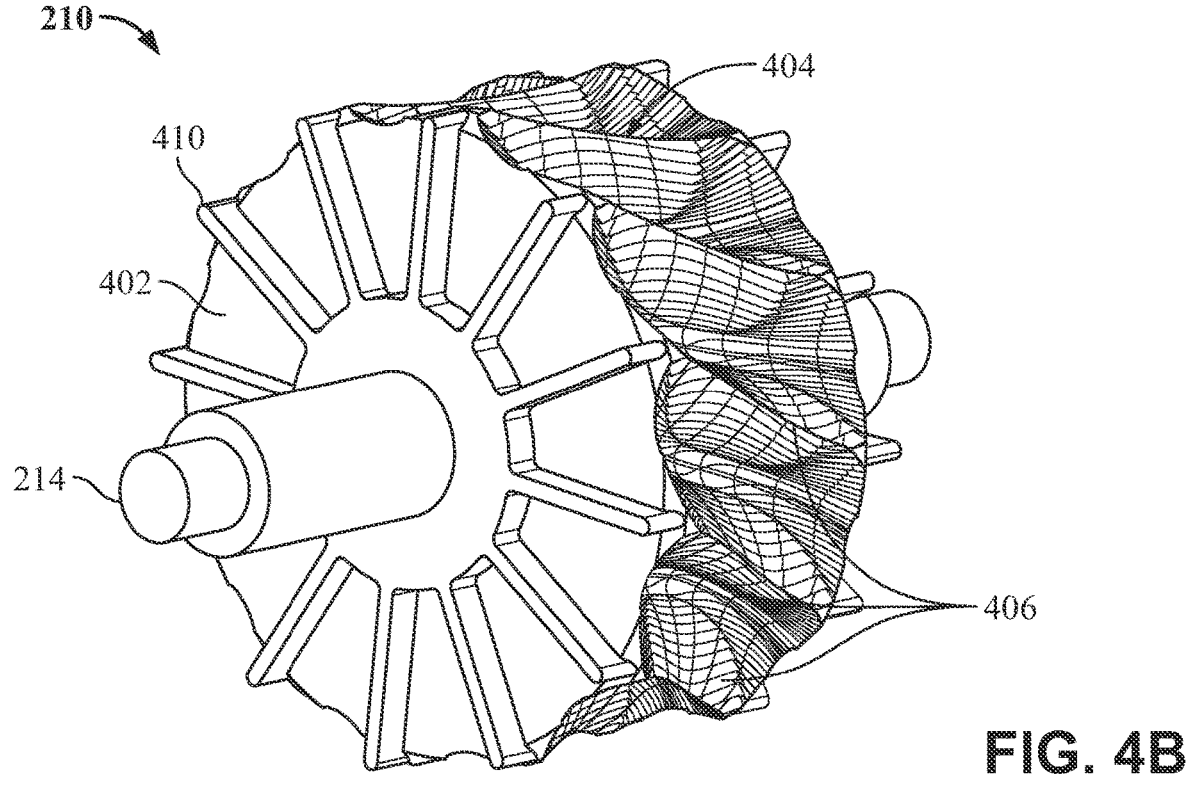

FIGS. 4A and 4B are perspective views of opposite sides of the example worm wheel 210 and the second shaft 214. In some examples, the worm wheel 210 and the second shaft 214 are constructed as a single unitary part or component (e.g., a monolithic structure). In other examples, the worm wheel 210 and the second shaft 214 are separate components that are non-rotatably coupled, such as via welding, press fit, or one or more fasteners.

In the illustrated example, the worm wheel 210 has a first side surface 400, a second side surface 402 opposite the first side surface 400, and a peripheral edge 404 between the first and second side surfaces 400, 402. In the illustrated example, the second shaft 214 extends perpendicularly outward from the first and second side surfaces 400, 402.

In the illustrated example, the peripheral edge 404 of the worm wheel 210 has or forms a plurality of teeth 406 (three of which are referenced in each of FIGS. 4A and 4B). Each of the teeth 406 extends between the first and second side surfaces 400, 402. The teeth 406 are shaped and sized to mesh with the worm gear 208. In some examples, the teeth 406 are arranged at a designated lead angle (e.g., an angle between the orientation of the first plurality of teeth 406 of the worm wheel 210 and a plane of rotation). In some examples, the designated lead angle may be between 25°-30°. In other examples, the lead angle can be higher or lower.

As shown in FIG. 4A, the worm wheel 210 has a first plurality of vanes 408 (one of which is referenced in FIG. 4A) on the first side surface 400. In some examples, the first plurality of vanes 408 are formed integrally with the first side surface 400. Each of the vanes 408 extends radially between a center or central region of the first side surface 400 and the peripheral edge 404. The vanes 408 collect lubricant as the worm wheel 210 rotates (e.g., when the actuator 116 drives the worm gear assembly 200), as disclosed in further detail herein. In this example, the vanes 408 are spaced equidistant from each other around the first side surface 400. In the illustrated example, there are twelve (12) vanes 408 on the first side surface 400. In some examples, the first side surface 400 includes one vane 408 for every one of the first plurality of teeth 406 on the peripheral edge 404. In the illustrated example, the vanes 408 are arranged such that the distal ends of the vanes 408 are aligned with the teeth 406 at the intersection of the first side surface 400 and the peripheral edge 404. In other examples, the first side surface 400 can have more or fewer vanes 408 and/or the vanes 408 can be spaced differently. In the illustrated example, each of the vanes 408 has a substantially constant cross-sectional width between the central region and the distal end.

As shown in FIG. 4B, the worm wheel 210 has a second plurality of vanes 410 (one of which is referenced in FIG. 4B). In some examples, the second plurality of vanes 410 are formed integrally with the second side surface 402. Each of the vanes 410 extends radially between a center or central region of the second side surface 402 and the peripheral edge 404. The vanes 410 collect lubricant as the worm wheel 210 rotates (e.g., when the actuator 116 drives the worm gear assembly 200), as disclosed in further detail herein. In this example, the vanes 410 are spaced equidistant from each other around the second side surface 402. In the illustrated example, each of the vanes 408 has a substantially constant cross-sectional width between the central region and the distal end. In the illustrated example, the vanes 410 are arranged such that the distal ends of the vanes 410 are aligned with the teeth 406 at the intersection of the second side surface 402 and the peripheral edge 404. In the illustrated example, there are twelve (12) vanes 410 on the second side surface 402. As such, in some examples, the worm wheel 210 has the same number of vanes 408, 410 on each side as the number of teeth 406. In other examples, the second side surface 402 can have more or fewer vanes 410 and/or the vanes 410 can be spaced differently.

Figure 5:
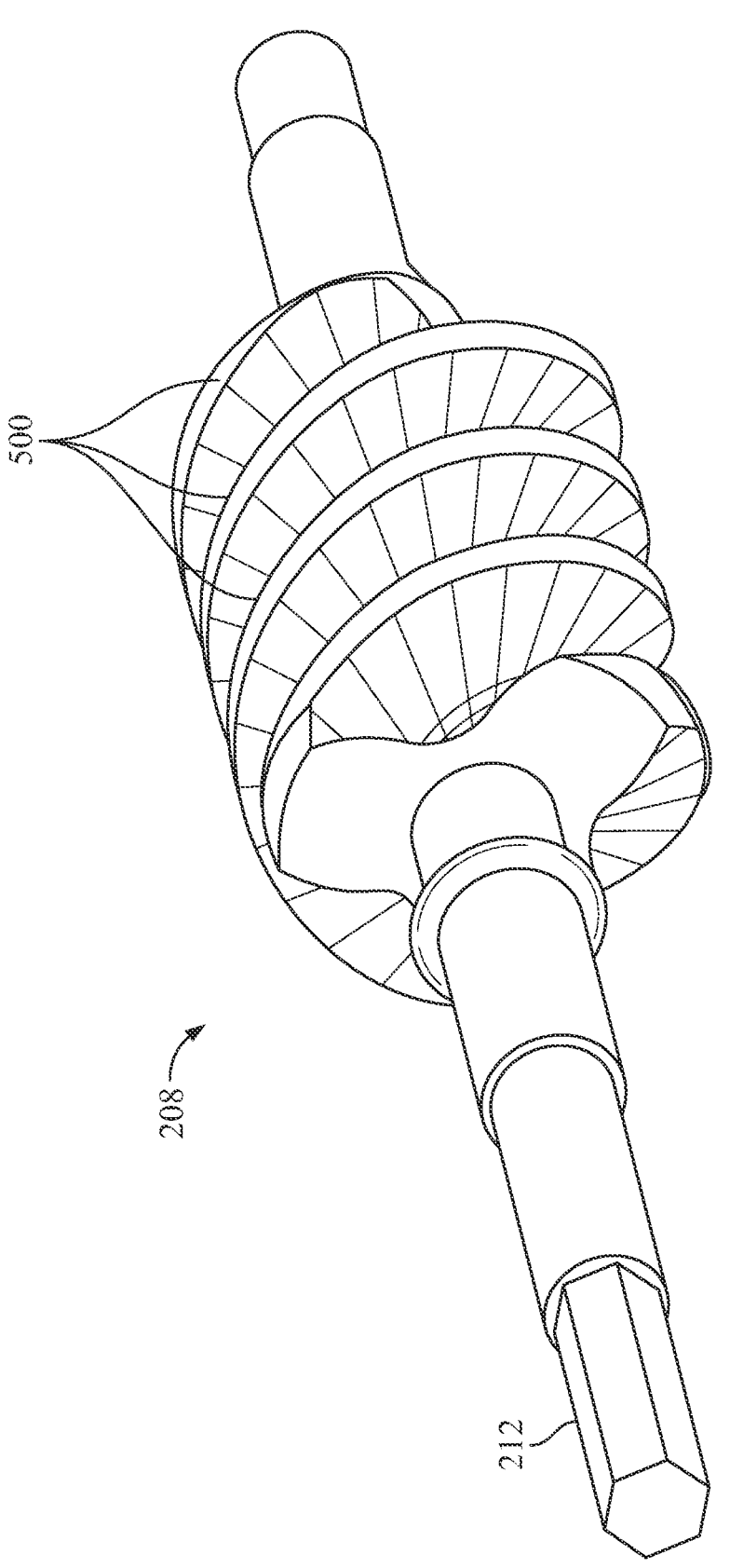
FIG. 5 is a perspective view of an example worm gear of the example worm gear assembly of FIG. 2.

FIG. 5 is a perspective view of the example worm gear 208 and the first shaft 212. In some examples, the worm gear 208 and the first shaft 212 are constructed as a single unitary part or component (e.g., a monolithic structure). In other examples, the worm gear 208 and the first shaft 212 are separate components that are non-rotatably coupled, such as via welding, press fit, or one or more fasteners. In some examples, the first shaft 212 is driven by the actuator 116, which then drives the worm wheel 210 to move the flaps 112, 114 to the desired position.

In the illustrated example, the worm gear 208 includes a screw or spiral tooth 500. In this examples, the spiral tooth 500 makes three turns, and may be considered there separate teeth. In other examples, the worm gear 208 can include more or fewer turns or teeth (e.g., one tooth, two teeth, four teeth, etc.). The spiral tooth 500 of the worm gear 208 of FIG. 5 may be oriented at a corresponding lead angle to that of teeth 406 (FIGS. 4A and 4B) such that when the worm gear 208 is rotated by the actuator 116 rotating the first shaft 212, the teeth 406 of the worm wheel 210 are meshed with the spiral tooth 500 of the worm gear 208 to rotate the worm wheel 210. While the configuration disclosed herein has the actuator 116 driving the worm gear 208, an alternate configuration may be covered herein where the actuator 116 drives the worm wheel 210 to rotate the worm gear 208 to change the position of the flaps 112, 114.

Figure 6:
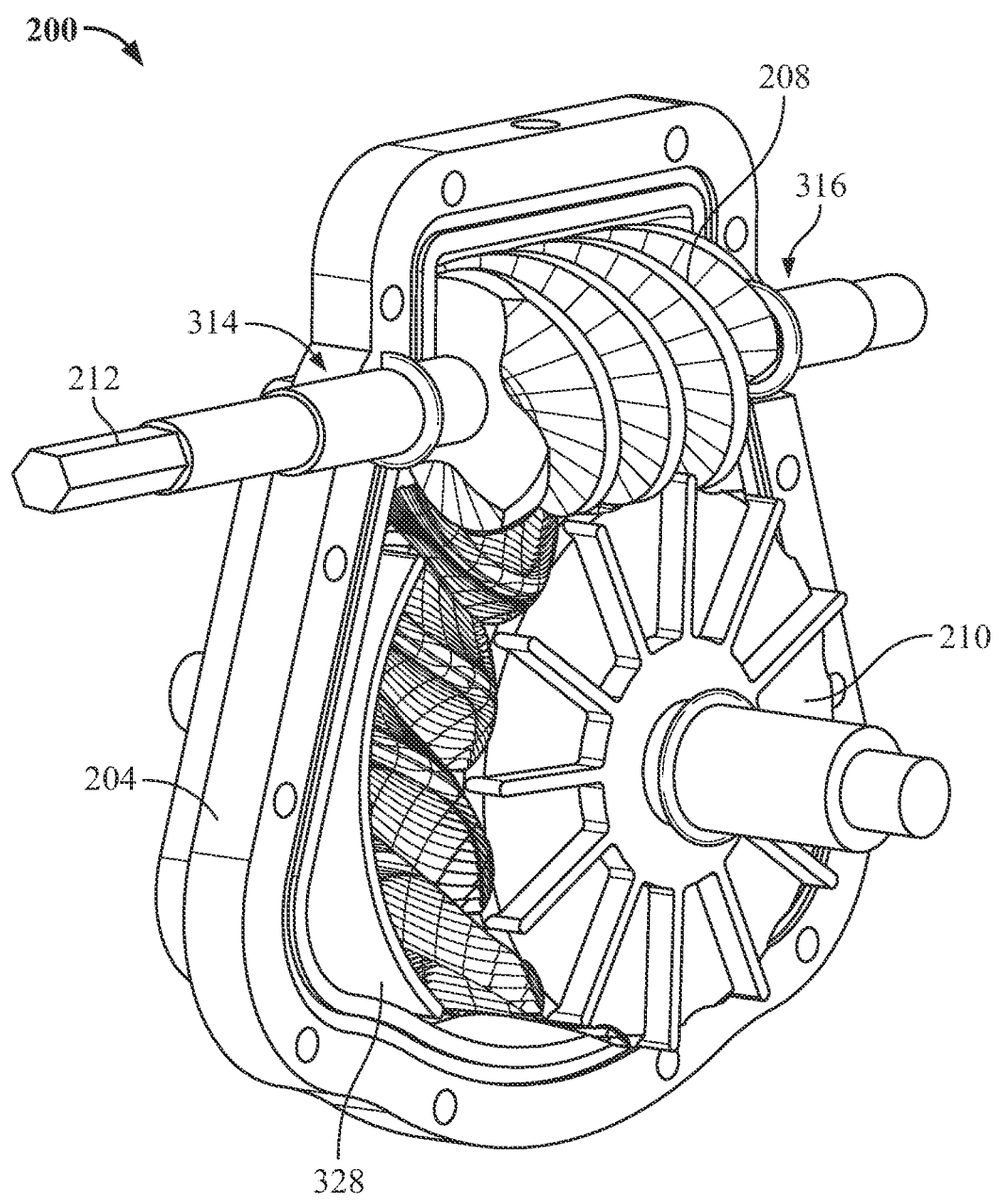
FIG. 6 is a partially assembled view of the example worm gear assembly of FIG. 2 showing the example worm gear and the example worm wheel in one of the example housing portions.

FIG. 6 is a partially assembled view of the worm gear assembly 200 showing the worm gear 208 and the worm wheel 210 inside the first housing portion 204. The first and second baffles (e.g., the first, second, third, and fourth baffle portions 326, 328, 330, 332) partially surround the worm wheel 210 when the worm wheel 210 is inside the housing 202. Additionally, the first shaft 212 extends through the first and second shaft openings (e.g., formed by the first, second, third, and fourth semi-circular grooves 314, 316, 318, 320). In some examples, as disclosed above, the first shaft 212 is operably connected to the actuator 116.

Figure 7:
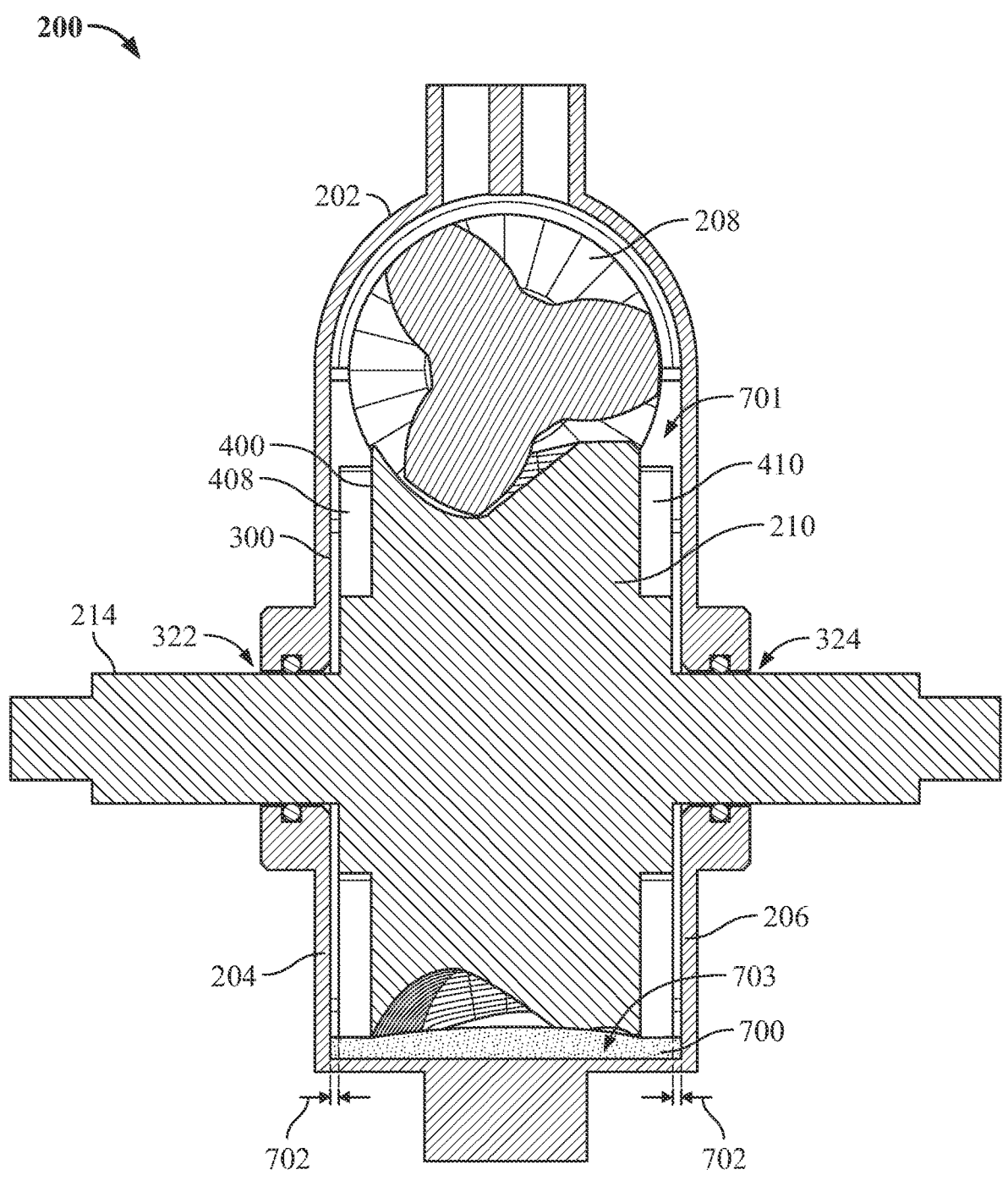
FIG. 7 is a cross-sectional view of the example worm gear assembly of FIG. 2.

FIG. 7 is a cross-sectional view of the worm gear assembly 200 with the worm gear 208 and the worm wheel 210 inside the housing 202. As illustrated in FIG. 7, the second shaft 214 extends through the third and fourth shaft openings 322, 324. In some examples, as disclosed above, the second shaft 214 is operably connected to the flaps 112, 114 to change the position of the flaps 112, 114.

In the illustrated example, the housing 202 defines an internal cavity 701 (e.g., a chamber). The worm gear 208 and the worm wheel 210 are disposed in the cavity 701 and are meshed together. In the illustrated example, the worm gear 208 is over or above the worm wheel 210 relative to the ground. In some examples, the worm gear assembly 200 is disposed in this orientation when coupled to the aircraft 102 (FIG. 1).

The worm gear assembly 200 can include a lubricant (e.g., oil) to lubricate the gears. As shown in FIG. 7, a lubricant pool 700 is formed along a bottom portion 703 of the internal cavity 701 of the housing 202. The worm wheel 210 is partially disposed in the lubricant pool 700. As disclosed in further detail herein, the worm wheel 210 collects and distributes the lubricant up to the gear mesh between the worm gear 208 and the worm wheel 210. In some examples, the lubricant pool 700 may contain only a small amount of lubricant. For example, the lubricant pool 700 may include 10-20 milliliters (mL) of lubricant (e.g., about 1 tablespoon). In other examples, the lubricant pool 700 may include more or less lubricant to sufficiently lubricate the gear mesh and reduce frictional wearing.

In the illustrated example of FIG. 7, the vanes 408, 410 on the worm wheel 210 are separated or spaced apart from the inner sides of the housing 202. In particular, the vanes 408 on the first side surface 400 of the worm wheel 210 are separated from the first side 300 of the first housing portion 204 by a clearance 702. Similarly, the vanes 410 on the second side surface 402 of the worm wheel are separated from the first side 304 of the second housing portion 206 by the clearance 702. As such, the vanes 408, 410 do not rub or slide against the inner surfaces of the housing 202. The clearance 702 is large enough to prevent rubbing, but small enough to prevent or reduce lubricant from leaking downward between the vanes 408, 410 and the first sides 300, 304 (the inner surfaces) of the housing 202. In some examples, the clearance 702 separating the vanes 408, 410 from the housing 202 is about 0.060 inches (e.g., ±0.005 inches). In other examples, the clearance 702 may be more or less than 0.060 inches. The clearance 702 may be determined by or based on the type of lubricant being used (e.g., the viscosity of the lubricant, amount of lubricant being used, etc.), the application in which the worm gear assembly is being used (e.g., an aircraft, a spacecraft, etc.), the temperature of the intended environment, etc.

Figures 8A, 8B:
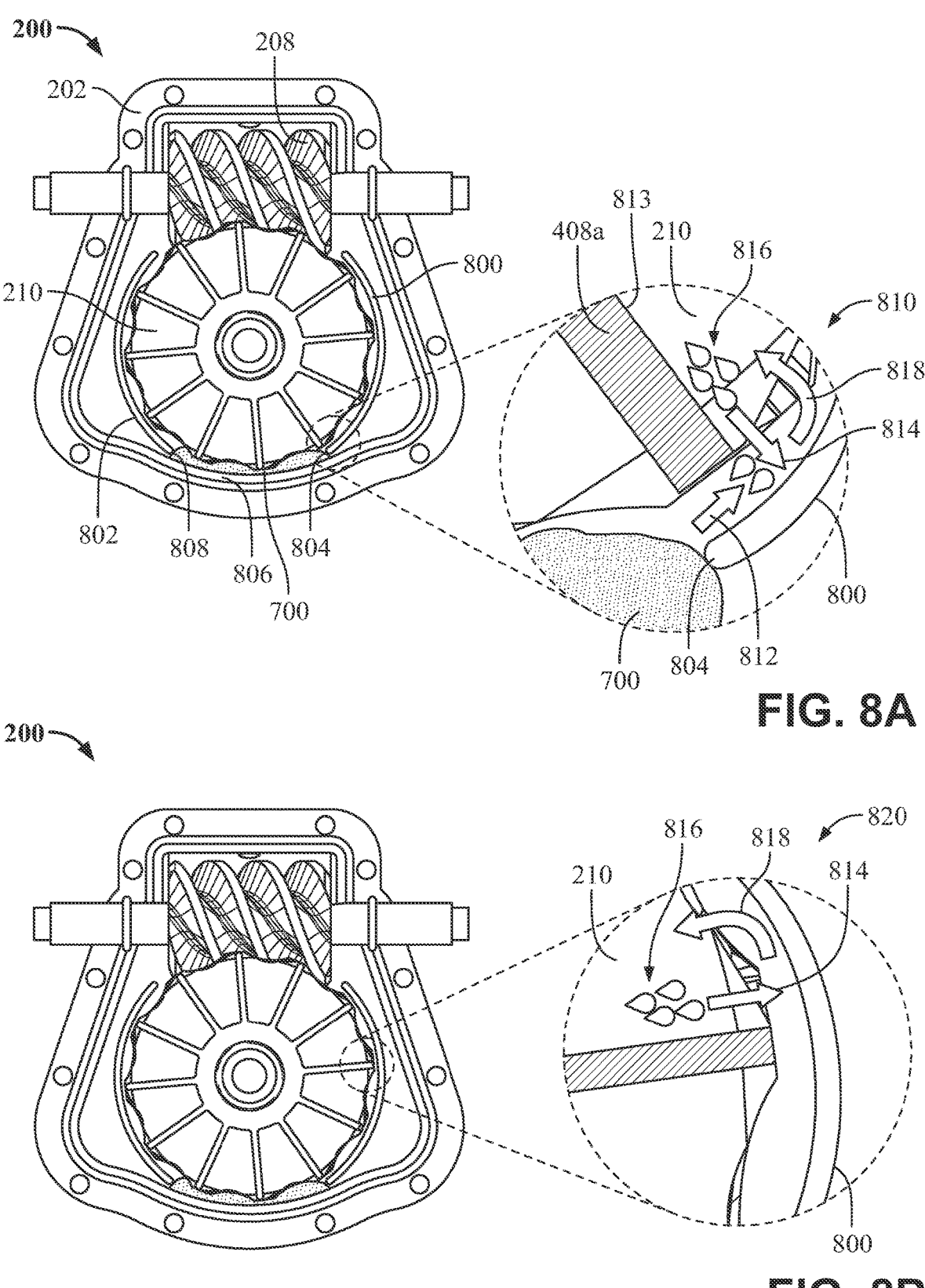
FIGS. 8A-8C show an example sequence of movement of a lubricant during operation of the example worm gear assembly of FIG. 2.
Figure 8C:
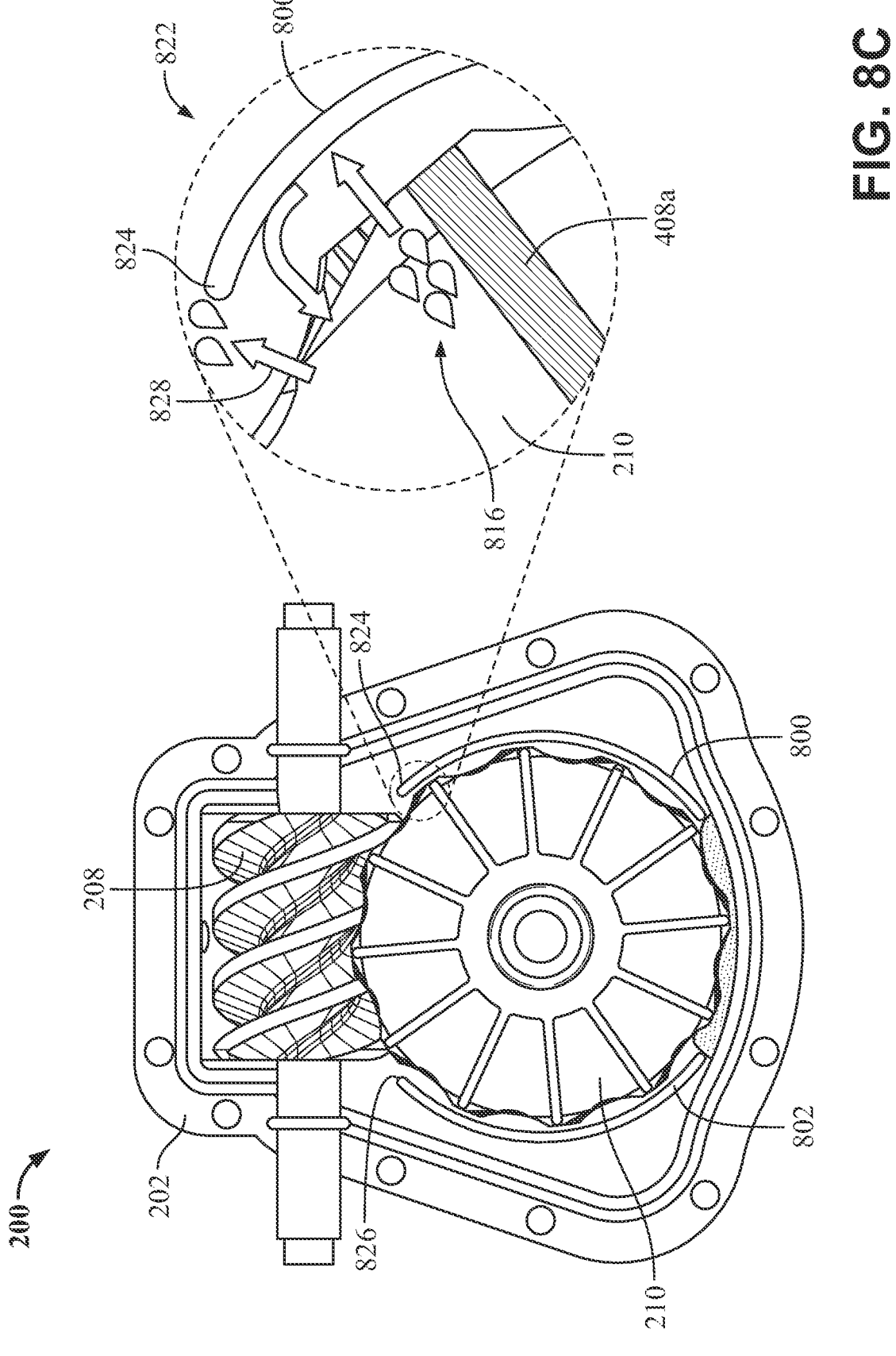

FIGS. 8A-8C show an example sequence of movement of the lubricant as the worm wheel 210 rotates. In the example sequence of FIGS. 8A-8C, the worm wheel 210 is rotating in a counterclockwise direction. However, the same performance/functions can be achieved by rotating the worm wheel 210 in a clockwise direction. The example sequence is described in connection with one of the vanes, referenced as the vane 408a. It is understood the example sequence occurs with the other vanes 408, 410.

As shown in FIG. 8A, the worm gear 208 is disposed above or over the worm wheel 210. The worm gear 208 is meshed with the worm wheel 210. The vanes 408 collect and distribute the lubricant up into the mesh of the worm gear 208 and the worm wheel 210. The worm wheel 210 is disposed between first and second baffles 800, 802. The first baffle 800 is formed by the first and third baffle portions 326, 330 (FIG. 3) and the second baffle 802 is formed by the second and fourth baffle portions 328, 332 (FIG. 3).

As shown in FIG. 8A, the first baffle 800 has a bottom edge 804 that is spaced from a bottom 806 of the housing 202. The second baffle 802 similarly has a bottom edge 808 that is spaced from the bottom 806 of the housing 202. This enables lubricant to flow back down from the top of the housing 202 and collect in the lubricant pool 700.

FIG. 8A shows a first stage 810 of the lubricant movement. As illustrated in FIG. 8A, the vane 408a is exiting the lubricant pool 700 and passing the bottom edge 804 of the first baffle 800.

As shown in the callout in FIG. 8A, the vane 408a collects lubricant from the lubricant pool 700 (indicated by arrow 812). In some examples, the vane 408a collects one or more (e.g., a few) drops of lubricant every time the vane 408a moves through the lubricant pool 700. The drops of lubricant stick or adhere to a side 813 of the vane 408a via surface tension.

When the vane 408 rotates past the bottom edge 804 as illustrated in FIG. 8A, the lubricant is subjected to a centrifugal force that forces the lubricant radially outward from the center of the worm wheel 210 (indicated by arrow 814). In particular, the worm gear 208 and the worm wheel 210 may be driven at a relatively high speed. This high speed creates a centrifugal force that forces the lubricant radially outward along the vane 408a. The first baffle 800 provides a barrier to keep the lubricant within a lubricant pocket 816 while the worm wheel 210 rotates to move the lubricant upward. The pocket 816 is formed by the vane 408a, an adjacent vane, and the first baffle 800. When subjected to the centrifugal force, the lubricant bounces off/is stopped by the first baffle 800 and is forced back into the lubricant pocket 816 (indicated by arrow 818). While the intended path for the lubricant is to be forced back into the lubricant pocket 816, some of the lubricant may fall between the vane 408a and the first baffle 800.

FIG. 8B shows a second stage 820 of the lubricant movement. As illustrated in FIG. 8B, the worm wheel 210 is in rotation after collecting the lubricant from the first stage 810. The first baffle 800 maintains the barrier to keep the lubricant subjected to the centrifugal force (arrow 814) within the lubricant pocket 816 by forcing the lubricant back into the lubricant pocket 816 (arrow 818).

FIG. 8C shows a third stage 822 of the lubricant movement. As illustrated in FIG. 8C, the first baffle 800 has a top edge 824 that is spaced from the top of the housing 202 and the worm gear 208. Similarly, the second baffle has a top edge 826 that is spaced from the top of the housing 202 and the worm gear 208. The top edges 824, 826 being separated from the top of the housing 202 allow lubricant to escape the lubricant pocket 816. In some examples, once the worm wheel 210 rotates to a position where the vane 408a is no longer surrounded by the first baffle 800 (e.g., the vane 408a has rotated past the top edge 824), the centrifugal force causes the lubricant to break away from the vane 408a (indicated by arrow 828). The lubricant is flung or sprayed into the mesh between the worm gear 208 and the worm wheel 210. Therefore, the vane 408a moves lubricant from the bottom 806 of the housing 202 to the worm gear 208 to lubricate an interface between the worm gear 208 and the worm wheel 210.

In some examples, when the worm wheel 210 has one vane 408 for every one of the first plurality of teeth 406 (on the first side surface 400 and/or the second side surface 402 of FIG. 4), the worm wheel 210 is constantly collecting lubricant as the worm wheel 210 rotates. This allows the worm gear assembly 200 to constantly maintain a lubricated state while the worm gear assembly 200 is in operation.

Figure 9:
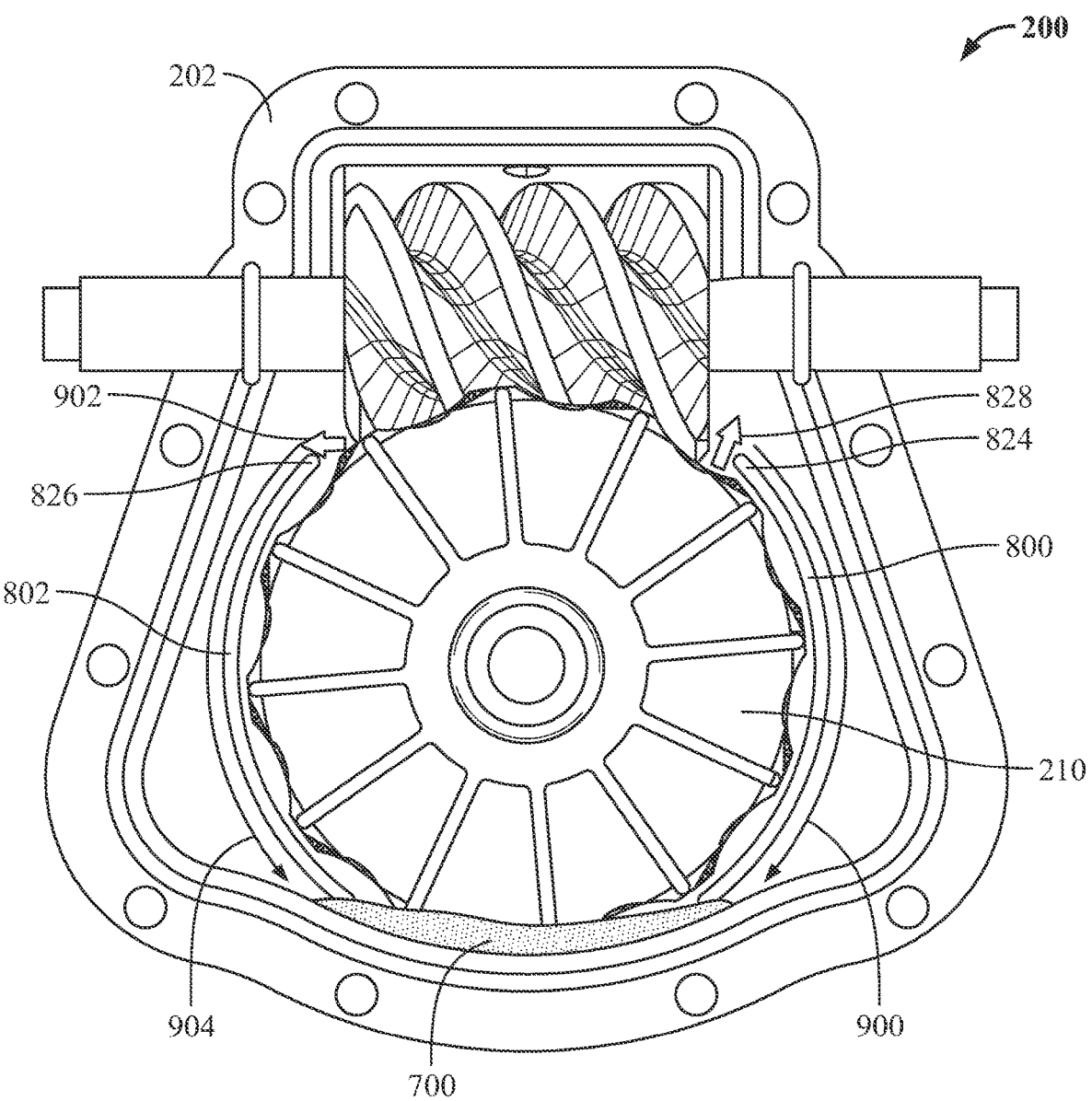
FIG. 9 illustrates an example return path for the lubricant during the operation illustrated in FIGS. 8A-8C.

FIG. 9 illustrates an example return path for the lubricant during operation of the worm gear assembly 200. In some examples, not all the lubricant from the lubricant pocket 816 is meshed with the teeth 406, 500 (FIG. 4 and FIG. 5). As indicated by arrow 900, some of the lubricant is flung from the lubricant pocket 816, over the top edge 824 of the first baffle 800 and flows down the opposite side of the first baffle 800 (e.g., opposite of the worm wheel 210) and is collected back into the lubricant pool 700. Some of the lubricant is moved along the gear mesh to the left side of the housing 202. As indicated by arrow 902, some of the lubricant is sprayed outward, over the top edge 826 of the second baffle 802. As indicated by arrow 904, the lubricant flows down the outside side of the second baffle 802 (e.g., opposite of the worm wheel 210) and is collected back into the lubricant pool 700. Allowing lubricant to collect back into the lubricant pool 700 keeps the teeth 406, 500 lubricated while not requiring all of the lubricant from the lubricant pocket 816 to be forced into the meshing of the teeth 406, 500. Additionally, returning unused lubricant back to the lubricant pool 700 allows future rotations of the worm wheel 210 to collect a sufficient amount of lubricant to continue to lubricate the worm gear assembly 200.

Figure 10:
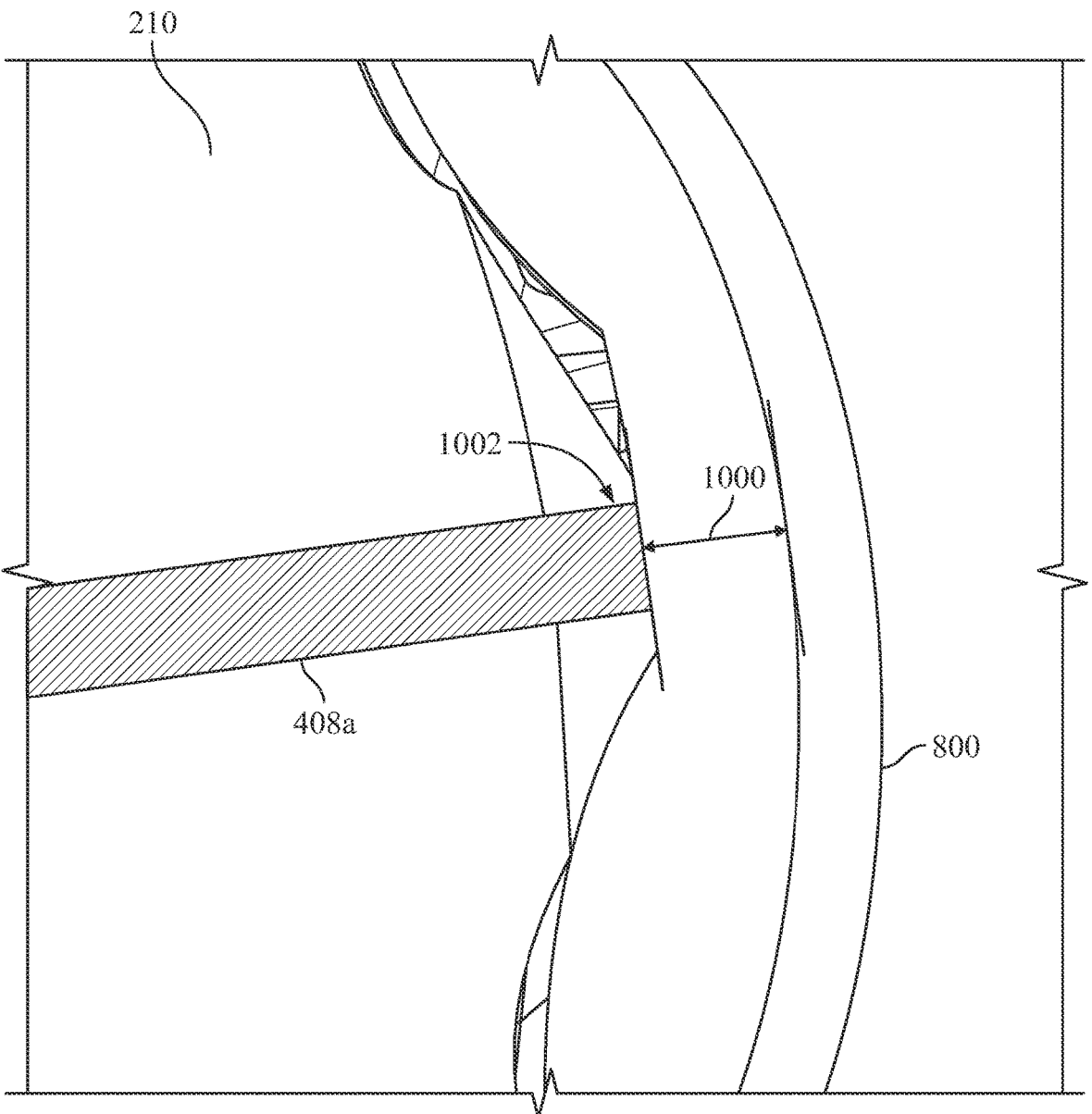
FIG. 10 is an enlarged view of an example vane of the example worm gear assembly of FIG. 2.

FIG. 10 is an enlarged view of the vane 408a of the worm wheel 210 along the first baffle 800. The other vanes 408, 410 are the same as the vane 408a. As such, any of the example aspects disclosed in connection with the vane 408a can likewise apply to the other vanes 408, 410. As shown in FIG. 10, the vane 408a has a distal end or tip 1002 at or near the peripheral edge 404 (FIG. 4) of the worm wheel 210. The tip 1002 is separated or spaced from the first baffle 800 by a clearance 1000. As such, the vane 408a does not engage or rub on the first baffle 800. The vane 408 may be similarly spaced from the second baffle 802 (FIGS. 8A-8C). The clearance 1000 is large enough to prevent rubbing, but small enough to prevent or reduce droplets of lubricant from leaking downward between the tip 1002 and the first baffle 800. In some examples, the clearance 1000 is about 0.030 inches (e.g., ±0.005 inches). In other examples, the clearance 1000 may be greater than or less than 0.030 inches. In some examples, the clearance 1000 may be determined by or based on the type of lubricant (e.g., based on the viscosity of the lubricant). For example, higher viscosity lubricants may allow for a larger clearance 1000 because the lubricant may form larger droplets. In other examples, the clearance 1000 may be smaller where the lubricant is less viscous.

In some examples, the tip 1002 of the vane 408a is shaped so as to break a surface tension of the lubricant droplets to enable the lubricant to be flung off of the vane 408a and thereby dispense the lubricant into the interface between the worm gear 208 and the worm wheel 210. For example, as shown in FIG. 10, the tip 1002 is square-shaped, which includes a sharp (e.g., 90°) corner or edge. Alternatively, any other shape may be interchangeably used herein to break the surface tension of the lubricant to allow the lubricant to be flung onto the gear mesh.

Figure 11:
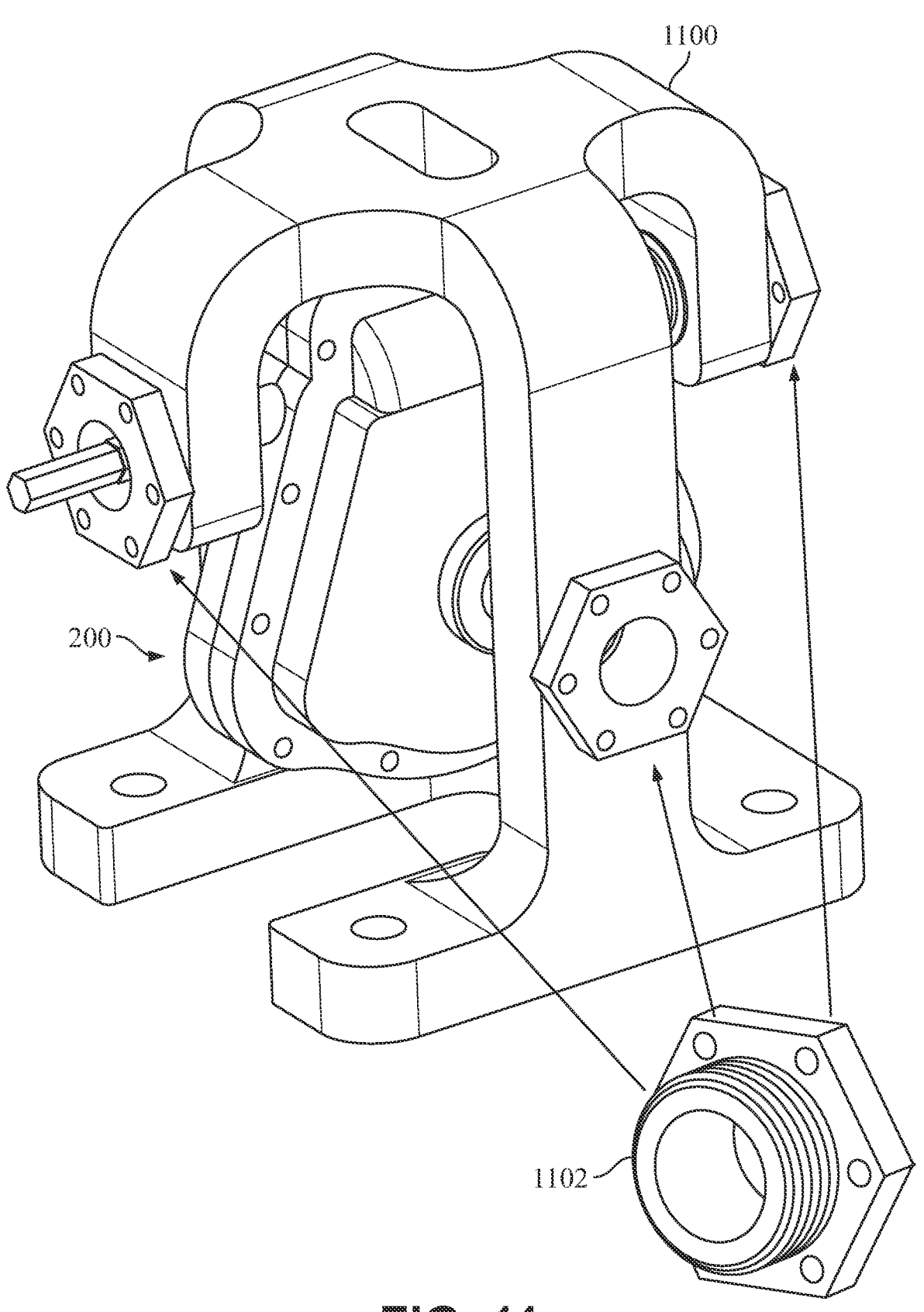
FIG. 11 illustrates an example rig for supporting the example worm gear assembly of FIG. 2.

FIG. 11 shows an example rig 1100 for supporting the worm gear assembly 200. The rig 1100 may be used to couple the worm gear assembly 200 to another structure, such as to a wing of an aircraft. In some examples, the rig 1100 includes an opening for each of the shafts 212, 214 (e.g., the first shaft 212 and the second shaft 214) to extend through the rig 1100. In some examples, the rig 1100 includes a bearing cap 1102 for each of the openings through which the shafts 212, 214 extend.

Figures 12A, 12B:
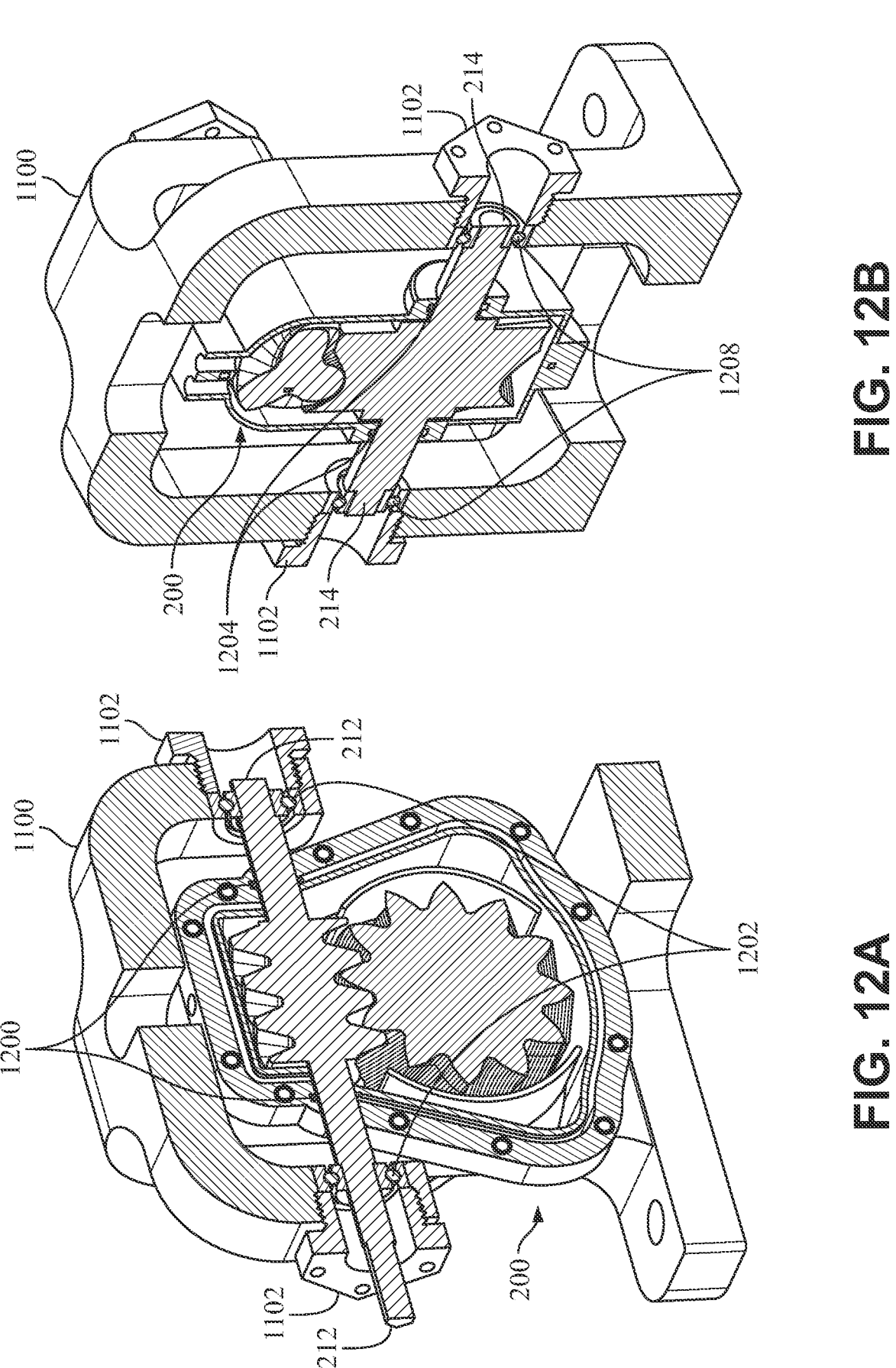
FIGS. 12A and 12B are cross-sectional views of the example worm gear assembly of FIG. 2 supported by the example rig of FIG. 11.

FIGS. 12A and 12B are cross-sectional views of the worm gear assembly 200 supported by the rig 1100. As shown in FIG. 12A, the first shaft 212 extends through the first shaft opening (e.g., the first and third semi-circular grooves 314, 318 of FIG. 3) and the second shaft opening (e.g., the second and fourth semi-circular grooves 316, 320 of FIG. 3) in the housing 202. The worm gear assembly 200 includes seals 1200 (e.g., o-rings) in the first and second shaft openings to reduce or prevent lubricant from escaping the housing 202. In the example illustration of FIG. 12A, the first shaft 212 extends through the bearing caps 1102 in the rig 1100. The first shaft 212 is supported by the rig 1100 and is allowed to freely rotate through first bearings 1202, which are held in place by the bearing caps 1102. The use of the first bearings 1202 allows the first shaft 212 to rotate while still being structurally supported.

As illustrated in FIG. 12B, the second shaft 214 extends through the third shaft opening 322 and the fourth shaft opening 324 (FIG. 3) in the housing 202. The worm gear assembly 200 includes seals 1204 (e.g., o-rings) in the third and fourth shaft openings 322, 324 to reduce or prevent lubricant from escaping the housing 202. As shown in FIG. 12B, the second shaft 214 extends through the bearing caps 1102. The second shaft 214 is supported by the rig 1100 and is allowed to freely rotate via second bearings 1208, which are held in place by the bearing cap 1102. The use of the second bearings 1208 allows the second shaft 214 to rotate while still being structurally supported.

An example method disclosed herein includes rotating the worm gear 208 with an actuator 116, rotating the worm wheel 210 through the rotation of the worm gear 208, collecting, as the worm wheel 210 rotates, a lubricant with the vane 408a from the lubricant pool 700, and dispensing the lubricant from the vane 408a onto the worm gear 208 using a centrifugal force. In some examples, the dispensing includes breaking a surface tension of the lubricant.

From the foregoing, it will be appreciated that example systems, methods, apparatus, and articles of manufacture have been disclosed that passively lubricates a worm gear assembly. The examples disclosed herein provide a highly reliable approach to lubricating the mesh of a worm gear without active spray nozzles or pumps. This reduces or eliminates the need for pump systems on an aircraft, which reduces weight and improves fuel efficiency.

Example methods, apparatus, systems, and articles of manufacture to passively lubricate a worm gear assembly are disclosed herein. Further examples and combinations thereof include the following:

Example 1 is a worm gear assembly comprising a housing defining an internal cavity, a worm gear in the internal cavity of the housing, the worm gear coupled to a first shaft extending through the housing, and a worm wheel in the internal cavity of the housing, the worm wheel meshed with the worm gear, the worm wheel coupled to a second shaft extending through the housing, the worm wheel including a first side surface, a second side surface opposite the first side surface, a peripheral edge with a plurality of teeth between the first side surface and the second side surface, and a vane on the first side surface, the vane extending radially between a center of the first side surface and the peripheral edge, the vane to move lubricant from a bottom of the housing to the worm gear to lubricate an interface between the worm gear and the worm wheel.

Example 2 includes the worm gear assembly of Example 1, wherein the vane has a tip near the peripheral edge of the worm wheel, and wherein the tip is shaped to break a surface tension of the lubricant and dispense the lubricant onto the interface.

Example 3 includes the worm gear assembly of Example 2, wherein the tip of the vane is square-shaped.

Example 4 includes the worm gear assembly of any of Examples 1-3, wherein the worm wheel has a first plurality of vanes on the first side surface, each of the vanes of the first plurality of vanes extending radially between the center of the first side surface and the peripheral edge.

Example 5 includes the worm gear assembly of Example 4, wherein the worm wheel has a same number of the vanes as the teeth.

Example 6 includes the worm gear assembly of Examples 4 or 5, wherein the worm wheel has a second plurality of vanes on the second side surface, each of the vanes of the second plurality of vanes extending radially between the center of the second side surface and the peripheral edge.

Example 7 includes the worm gear assembly of any of Examples 1-6, wherein the vane is integrally formed with the first side surface.

Example 8 includes the worm gear assembly of any of Examples 1-7, further including a first baffle and a second baffle in the internal cavity, the first and second baffles coupled to the housing, the first and second baffles having a curved shape and disposed adjacent a portion of the worm wheel.

Example 9 includes the worm gear assembly of Example 8, wherein the first and second baffles have a same radius of curvature as the worm wheel.

Example 10 includes the worm gear assembly of Examples 8 or 9, wherein the first and second baffles are spaced apart from the bottom of the housing.

Example 11 includes the worm gear assembly of any of Examples 8-10, wherein the first and second baffles are spaced from the worm gear.

Example 12 includes the worm gear assembly of any of Examples 8-11, wherein a clearance between a tip of the vane and the first baffle is about 0.030 inches.

Example 13 is a method for passively lubricating a worm gear assembly, the method comprising rotating a worm gear of the worm gear assembly with an actuator, the worm gear assembly including the worm gear and a worm wheel meshed with the worm gear, rotating the worm wheel through the rotation of the worm gear, the worm wheel including a first side surface, a second side surface opposite the first side surface, a peripheral edge with a plurality of teeth between the first side surface and the second side surface, and a vane on the first side surface, the vane extending radially between a center of the first side surface and the peripheral edge, collecting, as the worm wheel rotates, a lubricant with the vane from a lubricant pool, and dispensing the lubricant from the vane onto the worm gear.

Example 14 includes the method of Example 13, wherein the dispensing includes breaking a surface tension of the lubricant.

Example 15 includes the method of Examples 13 or 14, wherein the worm gear assembly includes a baffle disposed along a portion of the worm wheel, the baffle to maintain the lubricant on the vane as the vane rotates along the baffle.

Example 16 includes the method of any of Examples 13-15, wherein the worm wheel includes one vane for every tooth on the worm wheel.

Example 17 is an aircraft comprising a high lift device moveably coupled to a wing of the aircraft, and a worm gear assembly to move the high lift device, the worm gear assembly including a housing defining an internal cavity, a first baffle and a second baffle in the internal cavity coupled to the housing, the first and second baffle having a curved shape, a worm gear in the internal cavity of the housing, the worm gear coupled to a first shaft extending through the housing, and a worm wheel in the internal cavity of the housing, the worm wheel meshed with the worm gear, the worm wheel coupled to a second shaft extending through the housing, the worm wheel disposed adjacent to the first and second baffles, the worm wheel including a first side surface, a second side surface opposite the first side surface, a peripheral edge with a plurality of teeth between the first side surface and the second side surface, and a vane on the first side surface, the vane to move lubricant from a bottom of the housing to the worm gear to lubricate an interface between the worm gear and the worm wheel.

Example 18 includes the aircraft of Example 17, wherein the vane has a tip near the peripheral edge of the worm wheel, and wherein the tip is shaped to break a surface tension of the lubricant and dispense the lubricant onto the worm gear.

Example 19 includes the aircraft of Example 18, wherein the tip of the vane is square-shaped.

Example 20 includes the aircraft of any of Examples 17-20, wherein the worm wheel has a first plurality of vanes on the first side surface and a second plurality of vanes on the second side surface, each of the first plurality of vanes and the second plurality of vanes extending radially between a center of the first side surface and the second side surface respectively and the peripheral edge.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A worm gear assembly comprising:
a housing defining an internal cavity;
a worm gear in the internal cavity of the housing, the worm gear coupled to a first shaft extending through the housing; and
a worm wheel in the internal cavity of the housing, the worm wheel meshed with the worm gear, the worm wheel coupled to a second shaft extending through the housing, the worm wheel including:
a first side surface;
a second side surface opposite the first side surface;
a peripheral edge with a plurality of teeth between the first side surface and the second side surface; and
a vane on the first side surface, the vane extending radially between a center of the first side surface and the peripheral edge, a tip of the vane extending between a dedendum and an addendum of the worm wheel.

2. The worm gear assembly of claim 1, wherein the tip of the vane is square-shaped.

3. The worm gear assembly of claim 1, wherein the worm wheel has a first plurality of vanes on the first side surface, each of the vanes of the first plurality of vanes extending radially between the center of the first side surface and the peripheral edge.

4. The worm gear assembly of claim 3, wherein the worm wheel has a same number of the vanes as the teeth.

5. The worm gear assembly of claim 3, wherein the worm wheel has a second plurality of vanes on the second side surface, each of the vanes of the second plurality of vanes extending radially between the center of the second side surface and the peripheral edge.

6. The worm gear assembly of claim 1, wherein the vane is integrally formed with the first side surface.

7. The worm gear assembly of claim 1, further including a first baffle and a second baffle in the internal cavity, the first and second baffles coupled to the housing, the first and second baffles having a curved shape and disposed adjacent a portion of the worm wheel.

8. The worm gear assembly of claim 7, wherein the first and second baffles have a same radius of curvature as the worm wheel.

9. The worm gear assembly of claim 7, wherein the first and second baffles are spaced apart from a bottom of the housing.

10. The worm gear assembly of claim 7, wherein the first and second baffles are spaced from the worm gear.

11. The worm gear assembly of claim 7, wherein a clearance between the tip of the vane and the first baffle is about 0.030 inches.

12. An aircraft comprising:
a high lift device moveably coupled to a wing of the aircraft; and
a worm gear assembly to move the high lift device, the worm gear assembly including:
a housing defining an internal cavity;
a baffle in the internal cavity coupled to the housing, the baffle having a curved shape;
a worm gear in the internal cavity of the housing, the worm gear coupled to a first shaft extending through the housing; and
a worm wheel in the internal cavity of the housing, the worm wheel meshed with the worm gear, the worm wheel coupled to a second shaft extending through the housing, the worm wheel positioned adjacent the baffle, the worm wheel including:
a first side surface;
a second side surface opposite the first side surface;
a peripheral edge with a plurality of teeth between the first side surface and the second side surface; and
a plurality of first vanes radially spaced on the first side surface, the first vanes extending radially from a first hub such that distal ends of the first vanes extend between a dedendum and an addendum of the worm gear.

13. The aircraft of claim 12, wherein each of the distal ends has a tip that is shaped to break a surface tension of a lubricant and dispense the lubricant onto the worm gear.

14. The aircraft of claim 13, wherein the tip is square-shaped.

15. The worm gear assembly of claim 12, wherein a first one and a second one of the first vanes and the baffle provide a first pocket to move lubricant from a bottom of the housing to the worm gear to lubricate an interface between the worm gear and the worm wheel.

16. The worm gear assembly of claim 12, wherein the distal ends of the first vanes align with the addendum of the worm gear.

17. A worm gear assembly comprising:
a housing defining an internal cavity;
a first baffle coupled to a first side of the housing; and
a worm wheel in the internal cavity of the housing, the worm wheel including:
a first side surface;
a second side surface opposite the first side surface;
a peripheral edge with a plurality of teeth between the first side surface and the second side surface;
a hub protruding from the first side surface, the hub adjacent a center of the first side surface; and
a first vane and a second vane protruding from the first side surface, the first and second vanes extending radially from the hub, the first vane having a first distal end positioned between a dedendum and an addendum of a first one of the teeth, the second vane having a second distal end positioned between the dedendum and the addendum of a second one of the teeth.

18. The worm gear assembly of claim 17, further including a second baffle in the internal cavity and coupled to a second side of the housing opposite the first side, the peripheral edge of the worm wheel positioned between the first baffle and the second baffle.

19. The aircraft of claim 15, wherein the worm wheel has a plurality of second vanes on the second side surface, each of the plurality of second vanes extending radially from a second hub adjacent a center of the second side surface such that distal ends of the second vanes extend between the dedendum and the addendum of the worm gear, a third one and a fourth one of the second vanes and the baffle providing a second pocket to move lubricant from the bottom of the housing to the worm gear to lubricate the interface between the worm gear and the worm wheel.

20. The worm gear assembly of claim 17, wherein the first vane is spaced from the second vane to define a space therebetween, wherein the first vane, the second vane, a portion of the hub between the first and second vanes, a portion of the first side surface between the first and second vanes, and the first baffle define a pocket to carry a lubricant when the worm wheel rotates within the housing.

21. The worm gear assembly of claim 20, further including a worm gear in the internal cavity of the housing, the worm gear coupled to a first shaft extending through the housing, wherein the worm wheel is coupled to a second shaft extending through the housing, and wherein the worm wheel is meshed with the worm gear.

22. The worm gear assembly of claim 21, wherein each of the distal ends of the first vane and the second vane includes a tip, and wherein the tip is shaped to break a surface tension of the lubricant and dispense the lubricant onto an interface between the worm wheel and the worm gear.

* * * * *